US006282516B1

United States Patent
Giuliani

(12) United States Patent
(10) Patent No.: US 6,282,516 B1
(45) Date of Patent: Aug. 28, 2001

(54) PROCESS, SYSTEM AND COMPUTER READABLE MEDIUM FOR IN-STORE PRINTING OF DISCOUNT COUPONS AND/OR OTHER PURCHASING INCENTIVES IN VARIOUS DEPARTMENTS WITHIN A RETAIL STORE

(75) Inventor: John A. Giuliani, Lake Forest, IL (US)

(73) Assignee: Catalina Marketing International, Inc., St. Petersburg, FL (US)

( * ) Notice: Subject to any disclaimer, the term of this patent is extended or adjusted under 35 U.S.C. 154(b) by 0 days.

(21) Appl. No.: 09/323,538

(22) Filed: Jun. 1, 1999

(51) Int. Cl.$^7$ .................................................. G06F 17/60
(52) U.S. Cl. .............................. 705/14; 705/16; 705/18; 705/21
(58) Field of Search ............................... 705/14, 16, 18, 705/21

(56) References Cited

U.S. PATENT DOCUMENTS

| Re. 34,915 | 4/1995 | Nichtberger et al. .................. 705/14 |
| Re. 36,116 | 2/1999 | McCarthy .............................. 705/14 |
| 3,792,437 | 2/1974 | Blumenthal et al. ........... 340/825.55 |

(List continued on next page.)

FOREIGN PATENT DOCUMENTS

WO 96/39671   12/1996  (WO) .
WO 98/38589   9/1998   (WO) .

OTHER PUBLICATIONS

Shulman, Richard; "role of World Wide Web in retailing", Supermarket Business, v51, n5, p73(2), May 1996.*
"AdForce and @pos.com Partner to Serve Ads at the Point–of–Sale: . . . ", Business Wire, p0100, Jun. 29, 1999.*
Kuchinskas, Susan; "The E–Commerce Cometh Buy, Buy.", ADWEEK Western Advertising News, v48, n38, p1Q, Sep. 21, 1998.*

"Shoppers tell marketeres to save breath on offers", Advertising Age, v 67, n3, p i2, Jan. 1996.*
Steinauer, Joan M, "A case for Incentives", Incentive v171n7 pp; Jul. 19, 1997.*

Primary Examiner—Vincent Millin
Assistant Examiner—Jagdish N Patel
(74) Attorney, Agent, or Firm—Oblon, Spivak, McClelland, Maier & Neustadt, P.C.

(57) ABSTRACT

A system, process and computer readable medium for distributing purchasing incentives throughout departments of a retail store including an incentive processor including a network controller and a database for storing shopping histories of consumers associated with respective unique consumer identifiers; a plurality of incentive distributors located throughout the departments of the retail store, each incentive distributor of the plurality of incentive distributors having a unique address, and including, a processor, a printing device, a network interface device, and one of a card reader device and a scanner device; and a network, coupling the network controller to network interface devices of the plurality of incentive distributors, for effecting two-way communications between the incentive processor and the plurality of incentive distributors. Each card reader device and each scanner device of the plurality of incentive distributors is configured to detect a card device passed therethrough or key tag device scanned therein, respectively. The card device and the key tag device having a unique consumer identifier encoded therein, and the unique consumer identifier is detected by a card reader or scanner device of a respective incentive distributor of the plurality of incentive distributors and transmitted via a network interface of the respective incentive distributor over the network to the network controller coupled to the incentive processor. The incentive processor is configured to generate the purchasing incentives based on a shopping history of a consumer associated with a detected unique consumer identifier received from the respective incentive distributor and a location of the respective incentive distributor determined from the unique address thereof.

9 Claims, 5 Drawing Sheets

U.S. PATENT DOCUMENTS

| | | | |
|---|---|---|---|
| 4,674,041 | 6/1987 | Lemon et al. | 705/14 |
| 4,703,423 | 10/1987 | Bado et al. | 705/1 |
| 4,723,212 | 2/1988 | Mindrum et al. | 705/14 |
| 4,821,186 | 4/1989 | Munakata et al. | 705/14 |
| 4,825,045 | 4/1989 | Humble | 235/383 |
| 4,833,308 | 5/1989 | Humble | 235/383 |
| 4,882,675 | 11/1989 | Nichtberger et al. | 705/14 |
| 4,882,724 | 11/1989 | Vela et al. | 705/14 |
| 4,896,791 | 1/1990 | Smith | 221/7 |
| 4,932,485 | 6/1990 | Mori | 177/25.15 |
| 4,941,090 | 7/1990 | McCarthy | 705/14 |
| 4,973,952 | 11/1990 | Malec et al. | 340/825.35 |
| 4,982,346 | 1/1991 | Girouard et al. | 705/14 |
| 5,039,848 | 8/1991 | Stoken | 235/381 |
| 5,056,019 | 10/1991 | Schultz et al. | 705/14 |
| 5,117,355 | 5/1992 | McCarthy | 705/14 |
| 5,176,224 | 1/1993 | Spector | 705/14 |
| 5,200,889 | 4/1993 | Mori | 705/14 |
| 5,201,010 | 4/1993 | Deaton et al. | 382/139 |
| 5,202,826 | 4/1993 | McCarthy | 705/14 |
| 5,227,874 | 7/1993 | Von Kohorn | 705/14 |
| 5,237,620 | 8/1993 | Deaton et al. | 705/10 |
| 5,249,044 | 9/1993 | Von Kohorn | 705/10 |
| 5,250,789 | 10/1993 | Johnsen | 705/14 |
| 5,256,863 | 10/1993 | Ferguson et al. | 380/24 |
| 5,287,268 | 2/1994 | McCarthy | 705/14 |
| 5,295,064 | 3/1994 | Malec et al. | |
| 5,305,196 | 4/1994 | Deaton et al. | 705/10 |
| 5,305,197 | 4/1994 | Axler et al. | 705/14 |
| 5,327,508 | 7/1994 | Deaton et al. | 705/10 |
| 5,353,218 | 10/1994 | De Lapa et al. | 705/14 |
| 5,368,129 | 11/1994 | Von Kohorn | 186/52 |
| 5,388,165 | 2/1995 | Deaton et al. | 705/10 |
| 5,406,271 | 4/1995 | Sonnendorfer et al. | 340/825.35 |
| 5,430,644 | 7/1995 | Deaton et al. | 705/10 |
| 5,448,471 | 9/1995 | Deaton et al. | 705/10 |
| 5,459,306 | 10/1995 | Stein et al. | 235/383 |
| 5,483,049 | 1/1996 | Schulze, Jr. | 705/14 |
| 5,490,078 | 2/1996 | Futakata et al. | 705/14 |
| 5,504,675 | 4/1996 | Cragun et al. | 705/14 |
| 5,557,721 | 9/1996 | Fite et al. | 705/14 |
| 5,592,560 | 1/1997 | Deaton et al. | 705/10 |
| 5,612,868 | 3/1997 | Off et al. | 705/14 |
| 5,621,812 | 4/1997 | Deaton et al. | 705/10 |
| 5,638,457 | 6/1997 | Deaton et al. | 705/10 |
| 5,642,485 | 6/1997 | Deaton et al. | 705/10 |
| 5,644,723 | 7/1997 | Deaton et al. | 705/10 |
| 5,649,114 | 7/1997 | Deaton et al. | 705/10 |
| 5,659,469 | 8/1997 | Deaton et al. | 705/10 |
| 5,675,662 | 10/1997 | Deaton et al. | 705/10 |
| 5,687,322 | 11/1997 | Deaton et al. | 705/10 |
| 5,708,782 | 1/1998 | Larson et al. | 705/14 |
| 5,710,416 | 1/1998 | Belknap et al. | 705/14 |
| 5,710,886 | 1/1998 | Christensen et al. | 705/14 |
| 5,727,153 | 3/1998 | Powell | 705/14 |
| 5,734,838 | 3/1998 | Robinson et al. | 705/14 |
| 5,734,839 | 3/1998 | Enoki et al. | 705/20 |
| 5,806,044 | 9/1998 | Powell | 705/14 |
| 5,821,513 | 10/1998 | O'Hagan et al. | |
| 5,822,735 | 10/1998 | De Lapa et al. | 705/14 |
| 5,832,457 | 11/1998 | O'Brien et al. | 705/14 |
| 5,845,259 | 12/1998 | West et al. | 705/14 |
| 5,855,007 | * 12/1998 | Jovicic et al. | 705/14 |
| 5,857,175 | * 1/1999 | Day et al. | 705/14 |
| 5,859,414 | 1/1999 | Grimes et al. | 235/383 |
| 5,884,277 | 3/1999 | Khosla | 705/14 |
| 5,887,271 | 3/1999 | Powell | 705/14 |
| 5,890,135 | 3/1999 | Powell | 705/14 |
| 5,899,980 | * 5/1999 | Wilf et al. | 705/26 |
| 5,907,830 | * 5/1999 | Engel et al. | 705/14 |
| 5,970,469 | * 10/1999 | Scroggie et al. | 705/14 |
| 5,974,399 | * 10/1999 | Giuliani et al. | 705/14 |
| 5,995,015 | * 11/1999 | DeTemple et al. | 340/825.49 |
| 6,009,411 | * 12/1999 | Kepecs | 705/14 |
| 6,014,634 | * 1/2000 | Scroggie et al. | 705/14 |

* cited by examiner

PROCESS, SYSTEM AND COMPUTER READABLE MEDIUM FOR IN-STORE PRINTING OF DISCOUNT COUPONS AND/OR OTHER PURCHASING INCENTIVES IN VARIOUS DEPARTMENTS WITHIN A RETAIL STORE

CROSS REFERENCES TO RELATED APPLICATIONS

The present invention is related to commonly owned U.S. Pat. Nos. 4,723,212; 4,910,672; 5,173,851; and 5,612,868, U.S. patent application Ser. No. 08/663,680, filed on Jun. 14, 1996, and U.S. patent application Ser. No. 09/225,449, filed on Jan. 6, 1999, all of which are incorporated herein by reference.

BACKGROUND OF THE INVENTION

1. Field of the Invention

This invention relates generally to interconnected computer systems and, more particularly, to computer systems used in a retail store environment.

2. Discussion of Background

FIG. 1 shows a conventional retail store environment, including a store point-of-sale (POS) controller 10, a store point-of-sale loop (POS loop) 12, and multiple cash registers or point-of-sale terminals 14, two of which are shown. The store POS controller 10 communicates with the cash registers 14 through the store POS loop 12, which is a data bus that extends through the store from one cash register 14 to the next and to which all the cash registers 14 and the store POS controller 10 are connected. The store POS controller 10 has associated database files (not shown) for storing data pertaining to store activities, such as an item record file defining the items available for sale in the store.

A difficulty with the configuration shown in FIG. 1 is that this configuration does not support supplemental functions, such as in-store printing of discount coupons and/or other purchasing incentives, reading and processing coupons brought to the store by customers, and reading other coded items at the point-of-sale, such as bank cards, customer loyalty cards, such as frequent shopper cards, credit cards, and checks, etc.

Another system has been proposed utilizing a Kiosk located in a retail store (see e.g., U.S. Pat. No. 5,305,197 to Axler et al and U.S. Pat. No. 5,039,848 to Stoken). The Kiosk would provide support for supplemental functions, such as in-store printing of discount coupons and/or other purchasing incentives. However, this system does not typically support in-store printing of discount coupons and/or other purchasing incentives at any of various departments, such as the deli, cosmetics, butcher, seafood, produce, floral, etc., departments within the retail store since the Kiosk is a large apparatus and therefore is typically located at a predetermined location within the retail store.

Another system has been proposed utilizing coupon dispensers distributed throughout various location within a retail store for dispensing pre-printed coupons. These coupon dispensers, however, do not provide support for supplemental functions, such as in-store printing of discount coupons and/or other purchasing incentives. In addition, this system does not support in-store printing of discount coupons and/or other purchasing incentives based on a customer's shopping history since only pre-printed coupons are provided.

SUMMARY OF THE INVENTION

Accordingly, one object of this invention is to provide a novel process, system and computer readable medium for providing in-store printing of discount coupons and/or other purchasing incentives at any of various departments, such as the deli, cosmetics, butcher, seafood, produce, floral, etc., departments within a retail store.

Another object of this invention is to provide a novel process, system and computer readable medium for providing in-store printing of discount coupons and/or other purchasing incentives at any of various departments, such as the deli, cosmetics, butcher, seafood, produce, floral, etc., departments within a retail store based on a customer's shopping history.

The above and other objects are achieved according to the present invention by providing a new and improved process, system and computer readable medium for distributing purchasing incentives throughout departments of a retail store including an incentive processor including a network controller and a database for storing shopping histories of consumers associated with respective unique consumer identifiers; a plurality of incentive distributors located throughout the departments of the retail store, each incentive distributor of the plurality of incentive distributors having a unique address, and including, a processor, a printing device, a network interface device, and one of a card reader device and a scanner device; and a network, coupling the network controller to network interface devices of the plurality of incentive distributors, for effecting two-way communications between the incentive processor and the plurality of incentive distributors. Each card reader device and each scanner device of the plurality of incentive distributors is configured to detect a card device passed therethrough or key tag device scanned therein, respectively. The card device and the key tag device having a unique consumer identifier encoded therein, and the unique consumer identifier is detected by a card reader or scanner device of a respective incentive distributor of the plurality of incentive distributors and transmitted via a network interface of the respective incentive distributor over the network to the network controller coupled to the incentive processor. The incentive processor is configured to generate the purchasing incentives based on a shopping history of a consumer associated with a detected unique consumer identifier received from the respective incentive distributor and a location of the respective incentive distributor determined from the unique address thereof

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Point-of-sale (POS) computer systems in stores have been supplemented with additional components to handle such functions as in-store printing of discount coupons and/or other purchasing incentives, reading and processing coupons brought to the store by customers, and reading other coded items at the point-of-sale, such as bank cards, customer loyalty cards, such as frequent shopper cards, credit cards, and checks, etc. For example, commonly owned U.S. Pat. Nos. 4,723,212; 4,910,672; 5,173,851; and 5,612,868, U.S. patent application Ser. No. 08/663,680, filed on Jun. 14, 1996, and U.S. patent application Ser. No. 09/225,449, filed on Jan. 6, 1999, disclose systems for generating discount coupons in response to various sales transaction events detected at the point-of-sale.

Figure 1:
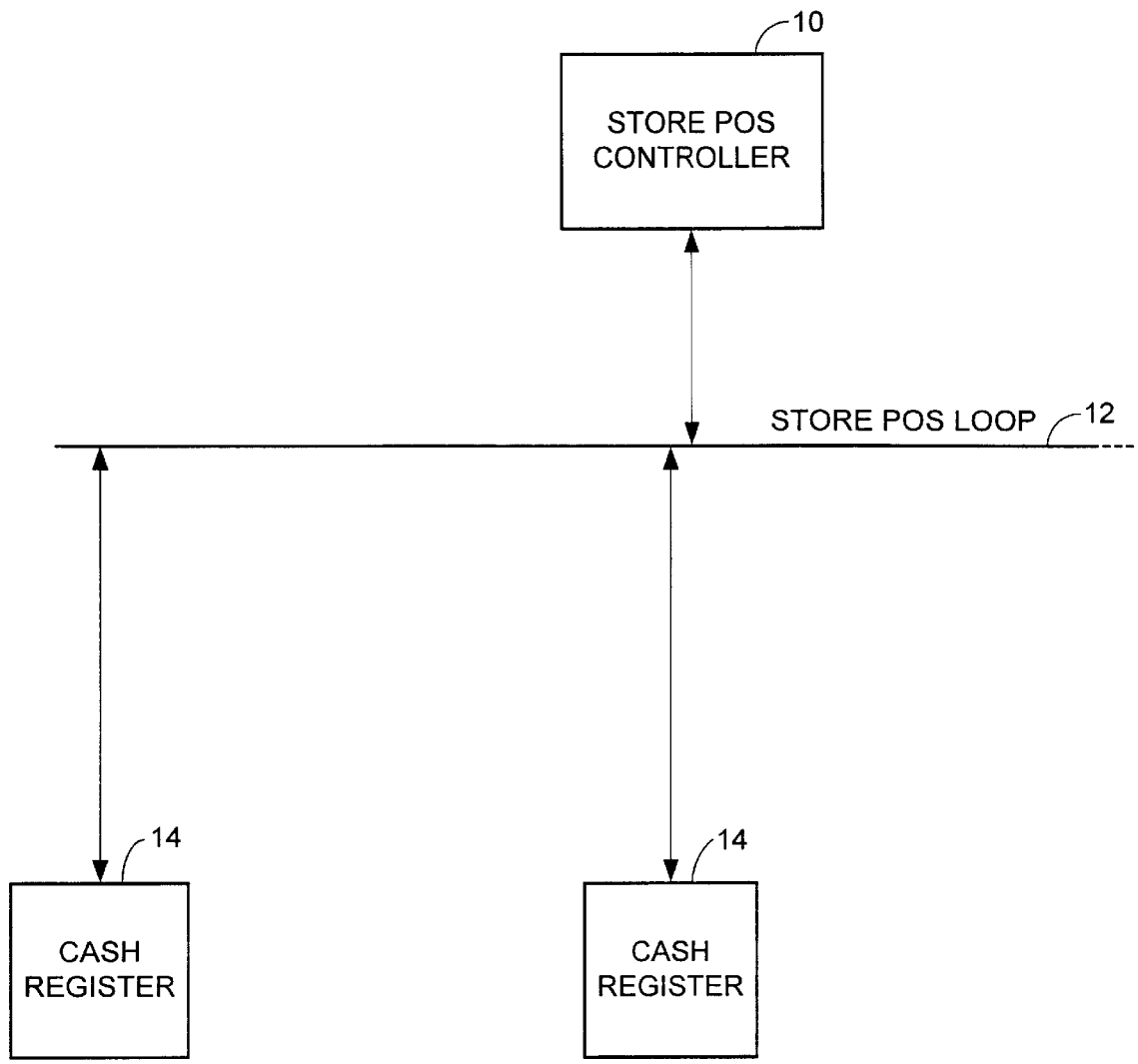
FIG. 1 is block diagram of a conventional computer interconnection architecture of a retail store environment.
Figure 2:
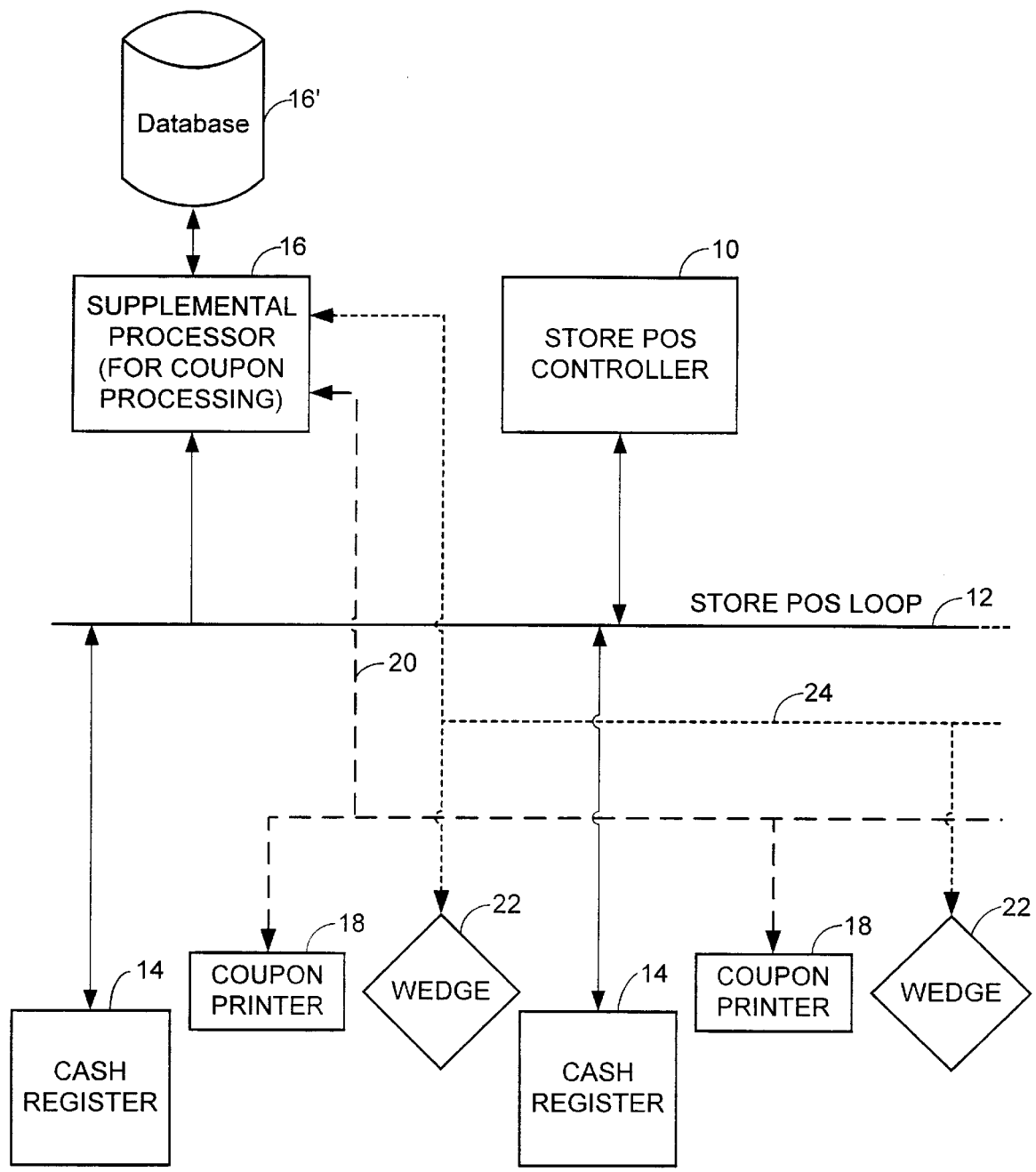
FIG. 2 is a block diagram of a computer interconnection architecture of a retail store environment of FIG. 1, supplemented with additional components to handle various additional functions at a point-of-sale (POS)

Referring now to the drawings, wherein like reference numerals designate identical or corresponding parts throughout the several views, and more particularly to FIG. 2 thereof, there is illustrated a computer system architecture intended for use in a retail store environment, and particularly for use in applications that supplement the normal functions of a point-of-sale computer system.

FIG. 2 shows relevant portions of a store point-of-sale system, including a store point-of-sale (POS) controller, indicated by reference numeral 10, a store point-of-sale loop (POS loop) 12, and multiple cash registers 14, two of which are shown. The store POS controller 10 communicates with the cash registers 14 through the store POS loop 12, which is a data bus that extends through the store from one cash register to the next. The store POS controller 10 has associated database files (not shown) for storing data pertaining to store activities, such as an item record file defining the items available for sale in the store. A supplemental processor 16 is provided and performs supplemental processing functions, such as in-store generation of discount coupons and other purchase incentives, etc. The supplemental processor 16 is connected to the store POS loop 12 and can monitor POS operations taking place at the various cash registers 14. The supplemental processor 16 is coupled to a database 16' for storing consumers' shopping history which may be used in selecting discount coupons and other purchase incentives, etc. to be generated. Each cash register 14 in such a system has an associated coupon printer 18. However, it will be appreciated that each coupon printer 18 or cash register 14 could include a "dual station" printer function for printing both discount coupons and receipts. When a consumer purchases certain designated items and presents them for purchase at the cash register 14, the supplemental processor 16 may generate discount coupons conditioned on the items purchased and other factors, such as the consumer's shopping history stored in database 16' and associated with a personal-identification-number (PIN) of the consumer. Thus, the supplemental processor 16 is connected to each of the coupon printers 18, as shown by broken lines 20.

The supplemental processor 16 may also be connected to other peripheral devices associated with each cash register 14. For example, each cash register 14 may have an associated wedge 22. A wedge is a data input device that decodes or reads data, such as bar code data or data from magnetically encoded cards, such as bank cards, customer loyalty cards, such as frequent shopper cards, credit cards, etc. The wedge 22 communicates the decoded information through a keyboard port on a computer associated with each cash register 14. Typically, the wedge device 22 plugs into the computer keyboard port, and the keyboard plugs into the wedge. In some POS functions, a consumer's card, such as bank card, customer loyalty card, such as frequent shopper card, credit card, etc., having a unique consumer identifier, such as a personal-identification-number (PIN) encoded therein, is scanned in the wedge device 22 and the information is used by the supplemental processor 16 when recording purchase transactions to the consumer's shopping history associated with the PIN in the database 16'. The wedges 22 are connected to the supplemental processor 16 through another set of lines, indicated by the broken lines 24.

However, a difficulty with the configuration shown in FIG. 2 is that this configuration does not support providing in-store printing of discount coupons and/or other purchasing incentives at any of various departments within a retail store since the coupon printers 18 and the wedge devices 22, are typically located at or near the cash registers 14 at the point-of-sale. It is noted that by providing the discount coupons and/or other purchasing incentives at any of various departments within a retail store, consumers are more likely to purchase the respective discounted product when checking out rather than on a subsequent shopping trip as is the case for coupons generated at the point-of-sale.

Figure 3:
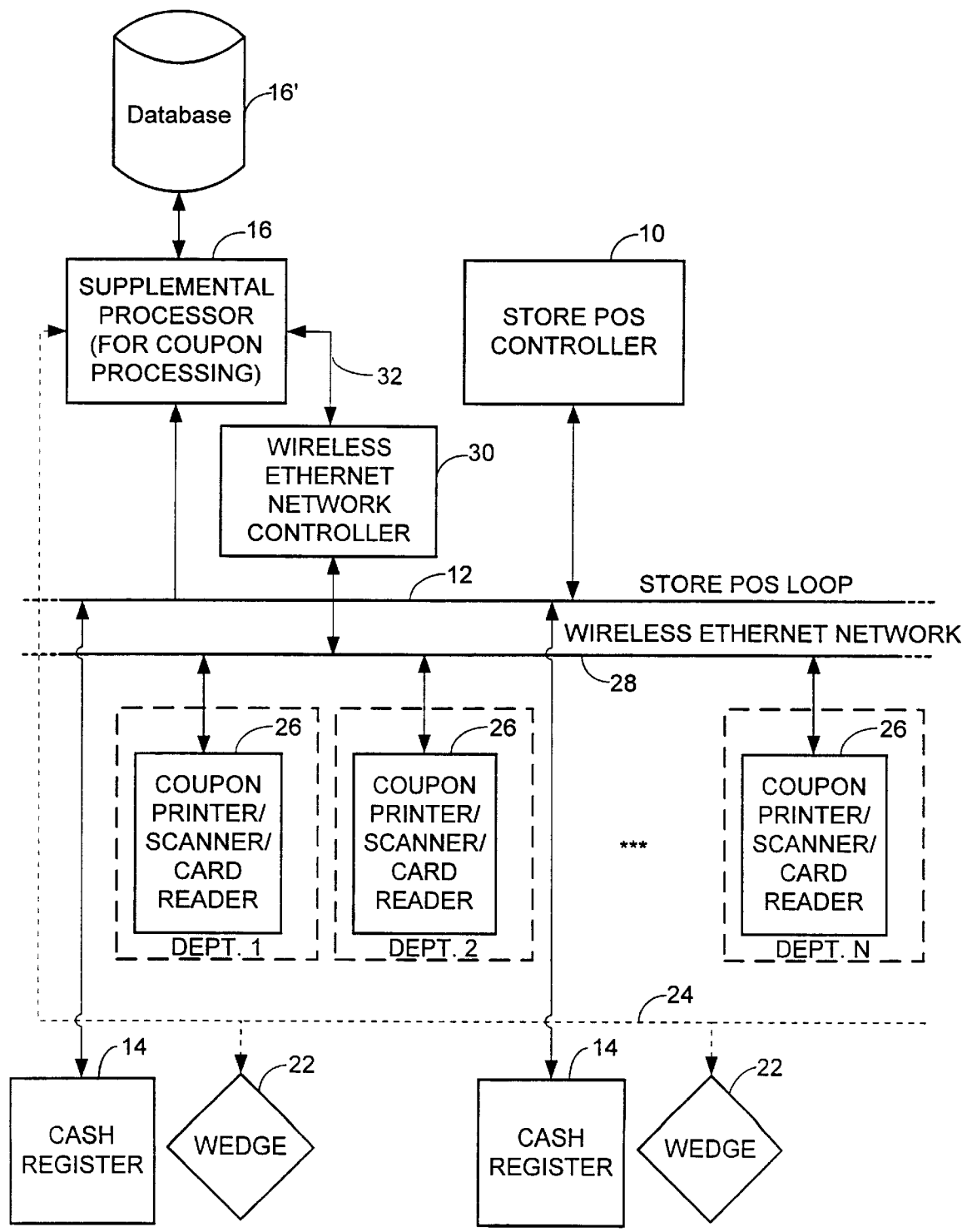
FIG. 3 is a block diagram of a computer interconnection architecture of a retail store environment of FIG. 1, supplemented with a coupon printer/scanner/card reader devices coupled to a supplemental processor via a wireless Ethernet network for providing in-store printing of discount coupons and/or other purchasing incentives at any of various departments within the retail store according to the present invention.

The embodiment shown in FIG. 3 addresses the above-noted concerns, wherein printer/scanner/card reader devices 26, located in various departments DEPT. 1–N of a retail store and having respective network addresses associated therewith, are coupled to the supplemental processor 16 via a wireless Ethernet network 28 and a wireless Ethernet controller 30 coupled to the supplemental processor 16 via bi-directional data bus 32. The Ethernet controller 30 may be attached to or integral with the supplemental processor 16.

A frequent shopper card or key tag device having a unique personal-identification-number (PIN) encoded therein is presented by consumers at the printer/scanner/card reader devices 26 which are located at other than the point-of sale (for example, the deli, cosmetics, butcher, seafood, produce, floral, etc., departments). The printer/scanner/card reader devices then issue discount coupons and/or other purchasing incentives based upon purchase behavior of the consumers as determined from the consumers' shopping history stored in database 16' and associated with respective PINs and based on the locations of the printer/scanner/card reader devices 26 as determined from respective network addresses associated therewith. The discount coupons and/or other purchasing incentives are then useable at the point-of sale during the present shopping trip or during a subsequent shopping trip.

Figure 4:
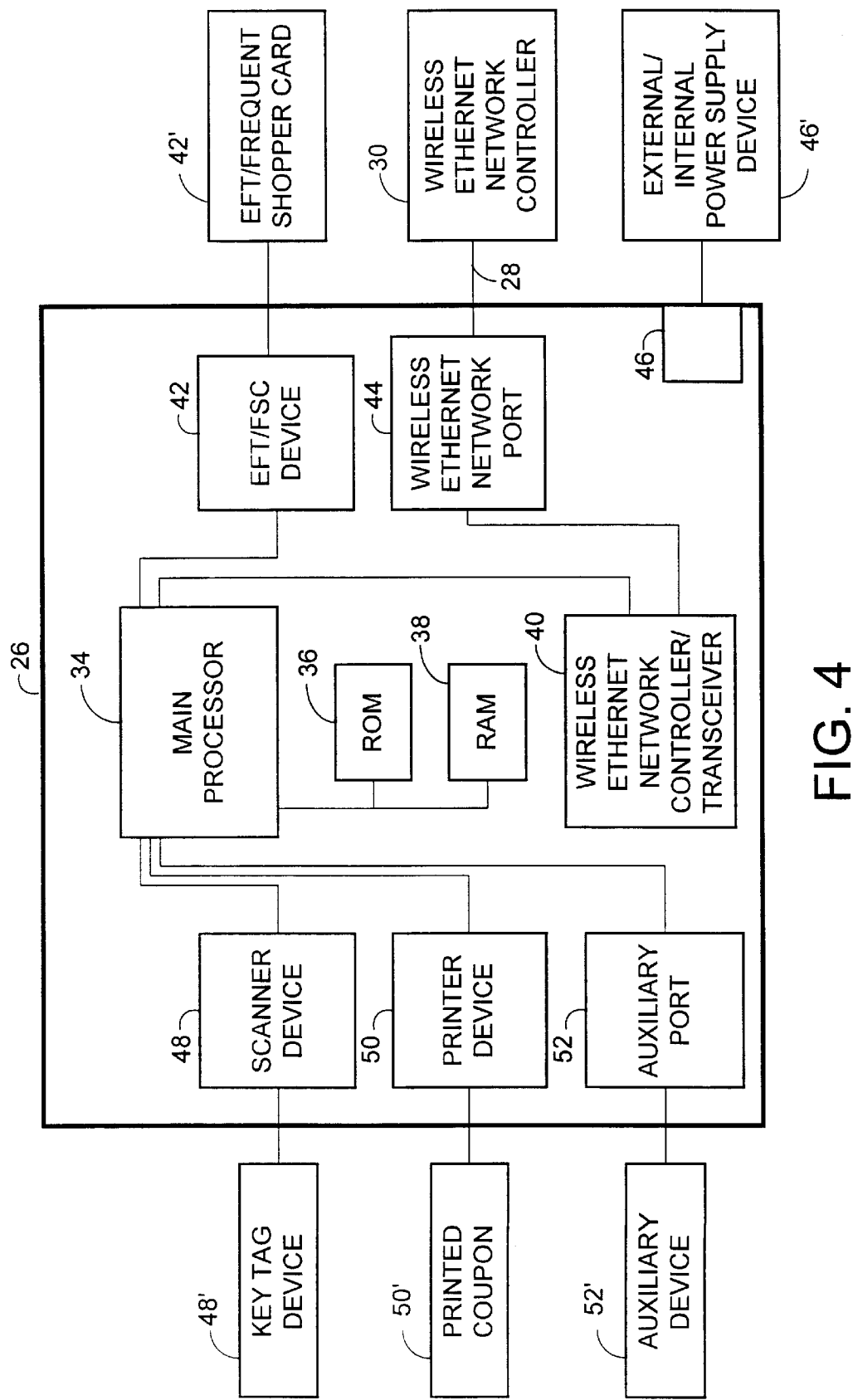
FIG. 4 is block diagram of the coupon printer/scanner/card reader device used in the architecture of FIG. 3 according to the present invention.

FIG. 4 shows an exemplary embodiment of the printer/scanner/card reader device 26 as having multiple input/output ports and devices, including, for example, (i) a small (e.g., 1"×1") scanner device 48 for scanning a key tag device 48' and integral with or attached to the printer/scanner/card reader device 26, (ii) a printer device 50 for printing discount coupons and/or other purchasing incentives 50' and integral with or attached to the printer/scanner/card reader device 26, (iii) an auxiliary port 52 for connecting to an auxiliary device 52', (iv) an EFT/frequent shopper device 42 for handling input of identification cards 42', such bank cards, credit cards, smart cards, frequent shopper cards, etc., from shoppers, (v) a wireless Ethernet network port 44, having a respective network address associated therewith, for connecting to the wireless Ethernet network controller 30 via the wireless Ethernet network 28, and (vi) a power supply device 46', connected via port 46' and integral with or attached to the printer/scanner/card reader device 26. As will be appreciated, other standards, such as TCP/IP, etc., other types of wireless communication links, fiber optic links, etc., as are known in the art may be used to interface to the various devices/ports of the printer/scanner/card reader device 26 with appropriate hardware/software modifications. The printer/scanner/card reader device 26 further includes a main processor 34, a read-only memory (ROM) 36, such as a flash read-only memory, etc., a random access memory (RAM) 38 and a wireless Ethernet network controller/transceiver 40.

Basically, the function performed by the main processor 34 of the printer/scanner/card reader device 26 is to regulate the flow of data to and from each internal device 42, 48 and 50 and the ports 52 and 44. The processor 34 uses transmit and receive buffers in the RAM 38 to achieve this end, for example, as described in U.S. patent application Ser. No. 09/225,449, filed on Jan. 6, 1999.

The printer/scanner/card reader devices 26 are located in various departments DEPT. 1–N of the retail store, other than at the point-of-sale, such as such as the deli, cosmetics, butcher, seafood, produce, floral, etc., departments. The printer/scanner/card reader devices are controlled by the supplemental processor 16 communicating via the wireless Ethernet network 28. The printer/scanner/card reader devices 26 print discount coupons and/or other purchasing incentives 50' based on (i) locations of the printer/scanner/card reader devices 26 as determined from respective network addresses associated therewith and (ii) consumers' purchase history stored in the database 16' and associated with respective PINs. The printing is triggered by a consumer (i) swiping the identification card 42', such as a frequent shopper card, etc., having the PIN encoded therein in the EFT/frequent shopper card port 42 or (ii) flashing the key tag device 48' having the PIN encoded therein in front of the scanner device 48 provided in or attached to the coupon printer/scanner/card reader device 26. The identification cards 42' have a magnetic strip for storing the encoded personal identification numbers (PINs) to uniquely identify the consumers. The key tag devices 48' are also encoded with the PINs to uniquely identify the consumers.

The operation of the coupon printer/scanner/card reader devices 26 in communicating with the supplemental processor 16 for providing in-store printing of discount coupons and/or other purchasing incentives at any of various departments within a retail store according to the present invention will now be described with reference to FIG. 5.

Figure 5:
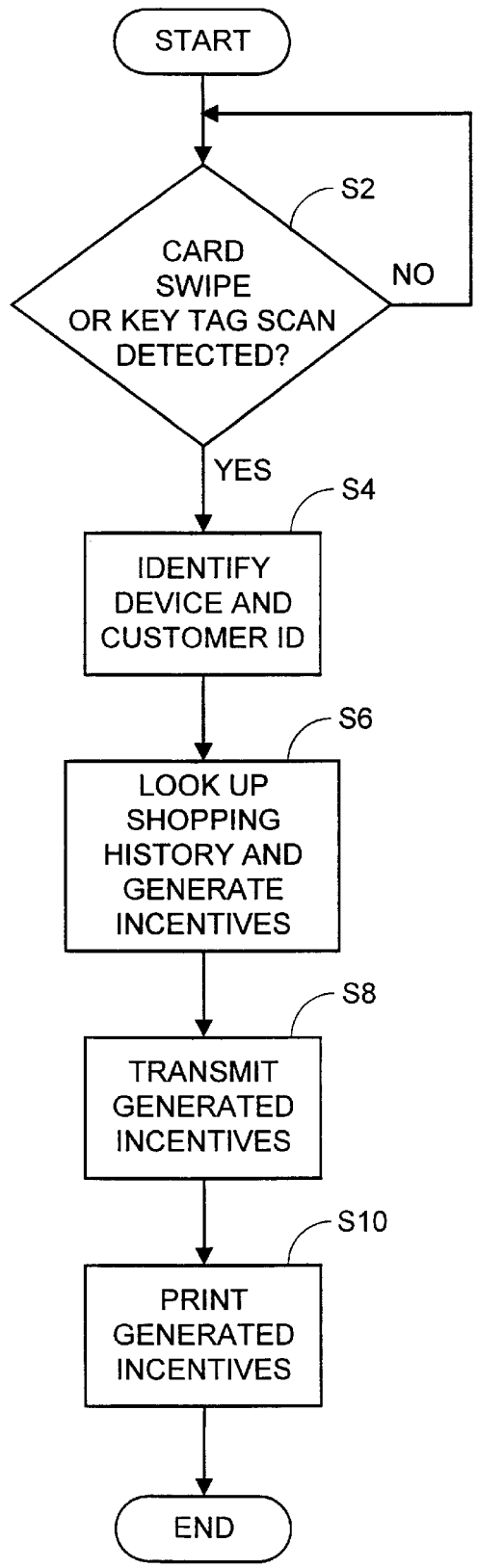
FIG. 5 is a flow chart illustrating operation of the coupon printer/scanner/card reader devices in communicating with the supplemental processor of FIG. 3 for providing in-store printing of discount coupons and/or other purchasing incentives at any of various departments within the retail store according to the present invention.

In FIG. 5, a customer visits, for example, the butcher dept of the retail store and swipes the frequent shopper card 42' or key tag device 48' through the EFT/FSC device 42 or the scanner device 48 of the coupon printer/scanner/card reader device 26 located at the butcher department and having a unique network address associated therewith. At step S2, a determination is made as to whether or not the card swipe or key tag device scan is detected by the coupon printer/scanner/card reader device 26. If the swipe or scan is a detected, at step S4, identity information including (i) an identity of the coupon printer/scanner/card reader device 26 based on the unique wireless Ethernet network device address assigned thereto and (ii) an identity of the customer based on the unique PIN encoded on the frequent shopper card 42' or the key tag device 48' is detected and transmitted to the supplemental processor 16.

At step S6, the supplemental processor 16 looks up a shopping history of the customer (e.g., prior history of meat purchases) stored in the database 16' based on the identity of the customer via the PIN and the identity of the coupon printer/scanner/card reader device 26 via the address thereof and generates discount coupons and/or other purchasing incentives information. The generated discount coupons and/or other purchasing incentives information is then transmitted to the coupon printer/scanner/card reader device 26 at the determined network address corresponding the butcher department at step S8. At step S10, the coupon printer/scanner/card reader device 26 located at the butcher department prints discount coupons and/or purchasing incentives 50' via the printer device 50. The printed discount coupons and/or purchasing incentives 50' may include, for example, meat products being promoted at that time as determined based on the location of the printer/scanner/card reader device 26 in the butcher department via the address thereof. Accordingly, all of the addresses of the printer/scanner/card reader devices 26 with corresponding departments associated therewith are stored in the database 16' for determining which types of discount coupons and/or purchasing incentives 50' to generate (e.g., meat products, dairy products, etc.) The printed discount coupons and/or purchasing incentives 50' being redeemable either at the time of the present shopping trip or at later date.

It will be appreciated from the foregoing that the present invention represents a significant advance in the field of retail store computer systems. In particular, the invention provides a system configuration whereby multiple printer/scanner/card reader devices 26 are provided to support in-store printing of discount coupons and/or other purchasing incentives at any of various departments, such as the deli, cosmetics, butcher, seafood, produce, floral, etc., departments within a retail store.

The mechanisms and processes set forth in the present description may be implemented using a conventional general purpose microprocessor (e.g., the main processor and the supplemental processor 16) programmed according to the teachings in the present specification (e.g., FIG. 5), as will be appreciated to those skilled in the relevant art(s). Appropriate software coding can readily be prepared by skilled programmers based on the teachings of the present disclosure, as will also be apparent to those skilled in the relevant art(s). However, as will be readily apparent to those skilled in the art, this invention may also be implemented by the preparation of application-specific integrated circuits or by interconnecting an appropriate network of conventional component circuits.

The present invention thus also includes a computer-based product which may be hosted on a storage medium and include instructions which can be used to program a microprocessor to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Although the preferred embodiment of the invention is described in terms of a coupon printer/scanner/card reader device 26 having multiple input/output ports and devices, such as the scanner device 48, the printer device 50, the auxiliary port 52, the EFT/frequent shopper device 42, and the wireless Ethernet network port 44 and controller transceiver 40, various other types of ports and devices, such as smart card, retinal scan, fingerprint analysis, voice analysis, image analysis, TCP/IP (i.e., internet), etc., ports and devices may be provided, by including appropriate hardware/software in the coupon printer/scanner/card reader device 26, as will be apparent to those skilled in the relevant arts.

Although the preferred embodiment of the invention is described in terms of providing in-store printing of discount coupons and/or other purchasing incentives in a retail store, such as a grocery store, having various departments, such as deli, cosmetics, butcher, seafood, produce, floral, etc., departments, the retail store may be a department store, having various departments, such as clothing, hardware, appliance, etc., departments, as will be apparent to those skilled in the relevant arts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for distributing purchasing incentives throughout departments of a retail store, comprising:
   an incentive processor including a network controller and a database for storing shopping histories of consumers associated with respective unique consumer identifiers;
   a plurality of incentive distributors located throughout said departments of said retail store, each incentive distributor of said plurality of incentive distributors having a unique address, and including, a processor, a printing device, a network interface device, and one of a card reader device and a scanner device; and
   a network, coupling said network controller to network interface devices of said plurality of incentive distributors, for effecting two-way communications between said incentive processor and said plurality of incentive distributors;
   wherein each card reader device and each scanner device of said plurality of incentive distributors is configured to detect a card device passed therethrough or key tag device scanned therein, respectively;
   said card device and said key tag device having a unique consumer identifier encoded therein, and said unique consumer identifier is detected by a card reader or scanner device of a respective incentive distributor of said plurality of incentive distributors and transmitted via a network interface of said respective incentive distributor over said network to said network controller coupled to said incentive processor;
   said incentive processor is configured to generate said purchasing incentives based on a shopping history of a consumer associated with a detected unique consumer identifier received from said respective incentive distributor and a location of said respective incentive distributor determined from said unique address thereof;
   the system further comprising:
   a point-of-sale processor;
   at least one point-of-sale cash register including a card reading device for reading said respective unique consumer identifiers from card devices having said unique consumer identifiers encoded therein; and
   a point-of-sale network coupling said point-of-sale processor, said at least one point-of-sale cash register and said incentive processor and effecting two-way communications therebetween;
   wherein said point-of-sale processor transmits said shopping histories of consumers to said incentive processor for storage in said database based on purchases of said consumers associated with said respective unique consumer identifiers at said least one point-of-sale cash register via said card reading device.

2. The system of claim 1, wherein said network controller comprises a wireless Ethernet network controller, said wireless network comprises a wireless Ethernet network, and each network interface device of said plurality of incentive distributors comprises a wireless Ethernet network interface device.

3. The system of claim 1, wherein one of said printing device, network interface device, card reader device and scanner device, of a respective incentive distributor of said plurality of incentive distributors, is one of attached to and integral with said respective incentive distributor.

4. A process for distributing purchasing incentives throughout departments of a retail store, comprising:
   storing in a database shopping histories of consumers associated with respective unique consumer identifiers via an incentive processor including a network controller;
   providing a plurality of incentive distributors located throughout said departments of said retail store, each incentive distributor of said plurality of incentive distributors having a unique address, and including, a processor, a printing device, a network interface device, and one of a card reader device and a scanner device;
   coupling via a network said network controller to network interface devices of said plurality of incentive distributors, for effecting two-way communications between said incentive processor and said plurality of incentive distributors;
   detecting via each card reader device and each scanner device of said plurality of incentive distributors a card device passed therethrough or key tag device scanned therein, respectively;
   said card device and said key tag device having a unique consumer identifier encoded therein;
   detecting said unique consumer identifier by a card reader or scanner device of a respective incentive distributor of said plurality of incentive distributors;
   transmitting said unique consumer identifier via a network interface of said respective incentive distributor over said network to said network controller coupled to said incentive processor;
   generating via said incentive processor said purchasing incentives based on a shopping history of a consumer associated with a detected unique consumer identifier received from said respective incentive distributor and a location of said respective incentive distributor determined from said unique address thereof;
   providing a point-of-sale processor;
   reading via at least one point-of-sale cash register including a card reading device said respective unique consumer identifiers from card devices having said unique consumer identifiers encoded therein;
   coupling via a point-of-sale network said point-of-sale processor, said at least one point-of-sale cash register and said incentive processor and effecting two-way communications therebetween; and
   transmitting via said point-of-sale processor, histories of consumers to said incentive processor for storage in said database based on purchases of said consumers associated with said respective unique consumer identifiers at said least one point-of-sale cash register via said card reading device.

5. The process of claim 4, wherein said network controller comprises a wireless Ethernet network controller, said wireless network comprises a wireless Ethernet network, and each network interface device of said plurality of incentive distributors comprises a wireless Ethernet network interface device.

6. The process of claim 4, wherein one of said printing device, network interface device, card reader device and scanner device, of a respective incentive distributor of said plurality of incentive distributors, is one of attached to and integral with said respective incentive distributor.

7. A computer program product comprising a computer storage medium having a computer program embedded in said computer storage medium for causing a computer to distribute purchasing incentives throughout departments of a retail store, said computer program performing the steps of:

storing in a database shopping histories of consumers associated with respective unique consumer identifiers via an incentive processor including a network controller;

providing a plurality of incentive distributors located throughout said departments of said retail store, each incentive distributor of said plurality of incentive distributors having a unique address, and including, a processor, a printing device, a network interface device, and one of a card reader device and a scanner device;

coupling via a network said network controller to network interface devices of said plurality of incentive distributors, for effecting two-way communications between said incentive processor and said plurality of incentive distributors;

detecting via each card reader device and each scanner device of said plurality of incentive distributors a card device passed therethrough or key tag device scanned therein, respectively;

said card device and said key tag device having a unique consumer identifier encoded therein;

detecting said unique consumer identifier by a card reader or scanner device of a respective incentive distributor of said plurality of incentive distributors;

transmitting said unique consumer identifier via a network interface of said respective incentive distributor over said network to said network controller coupled to said incentive processor;

generating via said incentive processor said purchasing incentives based on a shopping history of a consumer associated with a detected unique consumer identifier received from said respective incentive distributor and a location of said respective incentive distributor determined from said unique address thereof;

providing a point-of-sale processor;

reading via at least one point-of-sale cash register including a card reading device said respective unique consumer identifiers from card devices having said unique consumer identifiers encoded therein;

coupling via a point-of-sale network said point-of-sale processor, said at least one point-of-sale cash register and said incentive processor and effecting two-way communications therebetween; and transmitting via said point-of-sale processor said shopping histories of consumers to said incentive processor for storage in said database based on purchases of said consumers associated with said respective unique consumer identifiers at said least one point-of-sale cash register via said card reading device.

8. The computer program product of claim 7, wherein said network controller comprises a wireless Ethernet network controller, said wireless network comprises a wireless Ethernet network, and each network interface device of said plurality of incentive distributors comprises a wireless Ethernet network interface device.

9. The computer program product of claim 7, wherein one of said printing device, network interface device, card reader device and scanner device, of a respective incentive distributor of said plurality of incentive distributors, is one of attached to and integral with said respective incentive distributor.

* * * * *